United States Patent
Park

(10) Patent No.: US 8,502,791 B2
(45) Date of Patent: Aug. 6, 2013

(54) METHODS OF PROCESSING DATA IN TOUCH SCREEN DISPLAY DEVICE AND METHODS OF DISPLAYING IMAGE USING THE SAME

(75) Inventor: Jong-Lae Park, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 348 days.

(21) Appl. No.: 12/846,969

(22) Filed: Jul. 30, 2010

(65) Prior Publication Data

US 2011/0050607 A1 Mar. 3, 2011

(30) Foreign Application Priority Data

Aug. 27, 2009 (KR) .................. 10-2009-0079887

(51) Int. Cl.
*G06F 3/041* (2006.01)

(52) U.S. Cl.
USPC ...................................... 345/173; 178/18.01

(58) Field of Classification Search
USPC .................... 345/173–179; 178/18.01–18.09, 178/18.11, 19.01–19.07
See application file for complete search history.

(56) References Cited

U.S. PATENT DOCUMENTS

| 5,861,874 A * | 1/1999 | Joto .............................. 345/173 |
| 8,174,505 B2 * | 5/2012 | Park et al. ..................... 345/173 |
| 2005/0110769 A1 * | 5/2005 | DaCosta et al. .............. 345/173 |

FOREIGN PATENT DOCUMENTS

| JP | 2002-287888 | 10/2002 |
| JP | 2004-258837 | 9/2004 |
| JP | 2008-192012 | 8/2008 |

* cited by examiner

*Primary Examiner* — Stephen Sherman
(74) *Attorney, Agent, or Firm* — F. Chau & Associates, LLC

(57) ABSTRACT

In a method of processing data to reduce noise in a touch screen display device, a plurality of input coordinates are generated in response to a touch operation on a touch panel. A plurality of final coordinates are generated by filtering the plurality of the input coordinates using a valid area that is flexibly set based on a direction and a speed of the touch operation. An image inputted by the touch operation is displayed without a minute vibration or an abnormal distortion based on the plurality of the final coordinates.

11 Claims, 17 Drawing Sheets

METHODS OF PROCESSING DATA IN TOUCH SCREEN DISPLAY DEVICE AND METHODS OF DISPLAYING IMAGE USING THE SAME

CROSS-REFERENCE TO RELATED APPLICATION(S)

This application claims priority under 35 USC §119 to Korean Patent Application No. 10-2009-0079887, filed on Aug. 27, 2009, in the Korean Intellectual Property Office (KIPO), the contents of which are incorporated by reference herein in its entirety.

BACKGROUND

1. Technical Field

The present inventive concept relates to a touch screen display device, and more particularly, to methods of processing data to reduce noise in a touch screen display device and methods of displaying an image on a touch screen display device using the methods of processing data.

2. Discussion of the Related Art

When a user touches a touch panel, a touch screen display device periodically generates coordinates representing touch points on the touch panel to display an image corresponding to the coordinates.

A resistive touch panel includes two conductive layers. Insulated air is filled between the two conductive layers. When a user touches the touch panel, the two conductive layers come into contact with each other at a touch point and voltages of the two conductive layers are changed. Analog signals representing the touch point on the touch panel are generated by sampling the voltages of the two conductive layers, and the analog signals are converted into digital signals using an analog-to-digital converter (ADC) to generate an x-coordinate value and a y-coordinate value on the touch panel. However, the presence of noise may render difficult to correct determination of the touch points due to noise caused by the touch panel and the ADC.

A capacitive touch panel includes a conductive surface on which a current flows continuously. When a user touches the touch panel with a conductive material, such as a pen or a finger, electrons flow from the surface to the conductive material. The touch point may be determined by detecting a change in flow of the electrons using a sensor. Again, if noise is present, it may be difficult to correctly determine the touch points.

Generally, inductors and capacitors are used to reduce noise occurring while determining a touch point. However, using the inductors and capacitors may filter only an abrupt change in coordinates, but not a slight change, such as a minute vibration in coordinates. Further, it may be difficult to determine the optimum value of inductance and capacitance to reduce noise. Furthermore, inductors and capacitors occupy a comparatively large amount of space on a printed circuit board.

SUMMARY

Some exemplary embodiments provide methods of processing data in a touch screen display device and methods of displaying an image in a touch screen display device using the methods of processing data.

In a method of processing data in a touch screen display device according to an exemplary embodiment, a plurality of input coordinates are generated in response to a touch operation on a touch panel, and a plurality of final coordinates are generated by filtering the plurality of the input coordinates using a valid area that is flexibly set based on a direction and a speed of the touch operation.

The plurality of the input coordinates may be generated by generating a current detection coordinate by detecting a touch point on the touch panel, and generating a current input coordinate based on whether the current detection coordinate is included in a compensation area a center of which is located at a most recent final coordinate, where the most recent final coordinate is a most recently generated final coordinate among the plurality of the final coordinates.

The current detection coordinate may be generated by generating N coordinate samples by sampling the touch point N times, each of the N coordinate samples including a first direction coordinate value and a second direction coordinate value, where N is a positive integer, selecting K first direction coordinate values and K second direction coordinate values from N first direction coordinate values and N second direction coordinate values included in the N coordinate samples, respectively, determining a first direction coordinate value of the current detection coordinate as an arithmetic mean of the K first direction coordinate values, and determining as a second direction coordinate value of the current detection coordinate an arithmetic mean of the K second direction coordinate values, where N is a positive integer and K is a positive integer smaller than or equal to N.

The K first direction coordinate values and the K second direction coordinate values may be set by sorting the N first direction coordinate values and the N second direction coordinate values in an ascending order or in a descending order, respectively, and determining K median values of the sorted N first direction coordinate values as the K first direction coordinate values, and determining K median values of the sorted N second direction coordinate values as the K second direction coordinate values.

The current input coordinate may be generated by determining as the current input coordinate a moved current detection coordinate when the current detection coordinate is included in the compensation area, where the moved current detection coordinate is generated by moving the current detection coordinate such that a distance between the current detection coordinate and the most recent final coordinate is reduced, and determining as the current input coordinate the current detection coordinate when the current detection coordinate is excluded from the compensation area.

The current input coordinate may be determined as the moved current detection coordinate by determining a first direction coordinate value of the current input coordinate such that a ratio of a distance between the current input coordinate and the most recent final coordinate in a first direction to a distance between the current detection coordinate and the most recent final coordinate in the first direction substantially equals a ratio of a distance between the current detection coordinate and the most recent final coordinate in the first direction to a half of a length of the compensation area in the first direction, and determining a second direction coordinate value of the current input coordinate such that a ratio of a distance between the current input coordinate and the most recent final coordinate in a second direction to a distance between the current detection coordinate and the most recent final coordinate in the second direction substantially equals a ratio of a distance between the current detection coordinate and the most recent final coordinate in the second direction to a half of a length of the compensation area in the second direction.

The plurality of the final coordinates may be generated by determining a motion vector representing the touch operation based on previously generated final coordinates, setting the valid area based on the motion vector, determining a final coordinate as the current input coordinate when the current input coordinate is included in the valid area, and eliminating the current input coordinate when the current input coordinate is excluded from the valid area.

The motion vector may be determined as a vector having a start point as a second most recent final coordinate and having an end point as the most recent final coordinate, where the second most recent final coordinate is a most recently generated final coordinate among the plurality of the final coordinates generated before the most recent final coordinate is generated.

The valid area may be set as a circle shape, where a center of the valid area is an end point of the motion vector having a start point as the most recent final coordinate, and a radius of the valid area is equal to a length of the motion vector plus a predetermined number.

The valid area may be set as a diamond shape, where a center of the valid area is an end point of the motion vector having a start point at the most recent final coordinate and a distance between the center of the valid area, and each vertex of the valid area is equal to a length of the motion vector plus a predetermined number.

Whether the current input coordinate is included in the valid area may be determined by comparing a Manhattan distance between the center of the valid area and the current input coordinate with a Manhattan distance between the center of the valid area and the vertex of the valid area.

In a method of displaying an image in a touch screen display device according to some exemplary embodiments, a plurality of input coordinates are generated in response to a touch operation on a touch panel, a plurality of final coordinates are generated by filtering the plurality of the input coordinates using a valid area that is flexibly set based on a direction and a speed of the touch operation, and outputting the image inputted by the touch operation based on the plurality of the final coordinates.

The plurality of the input coordinates may be generated by generating a current detection coordinate by detecting a touch point on the touch panel, and generating a current input coordinate based on whether the current detection coordinate is included in a compensation area a center of which is located at a most recent final coordinate, where the most recent final coordinate is a most recently generated final coordinate among the plurality of the final coordinates.

The current input coordinate may be generated by determining the current input coordinate as a moved current detection coordinate when the current detection coordinate is included in the compensation area, where the moved current detection coordinate is generated by moving the current detection coordinate such that a distance between the current detection coordinate and the most recent final coordinate is reduced, and determining the current input coordinate as the current detection coordinate when the current detection coordinate is excluded from the compensation area.

The plurality of the final coordinates may be generated by determining a motion vector representing the touch operation based on previously generated final coordinates, setting the valid area based on the motion vector, determining a final coordinate as the current input coordinate when the current input coordinate is included in the valid area, and eliminating the current input coordinate when the current input coordinate is excluded from the valid area.

BRIEF DESCRIPTION OF THE DRAWINGS

Illustrative, non-limiting exemplary embodiments will be more clearly understood from the following detailed description taken in conjunction with the accompanying drawings.

DETAILED DESCRIPTION OF THE EMBODIMENTS

Various exemplary embodiments will be described more fully hereinafter with reference to the accompanying drawings, wherein like numerals may refer to like elements throughout the specification and the drawings.

Figure 1:
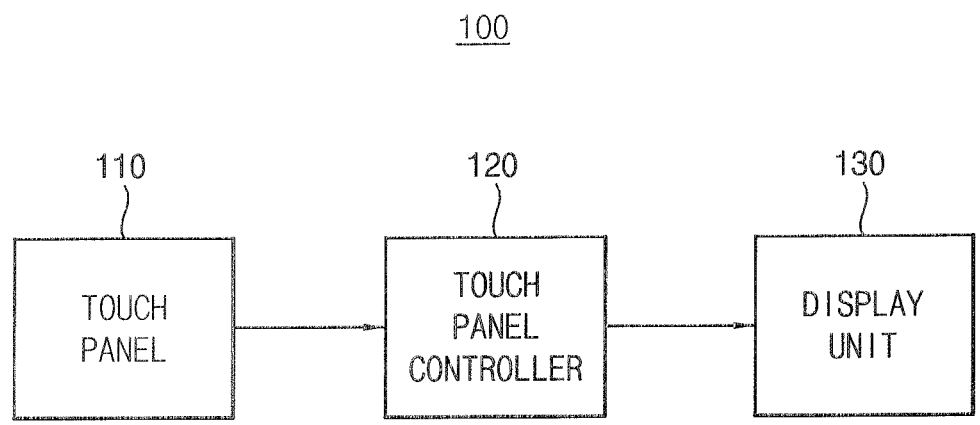
FIG. 1 is a block diagram illustrating a touch screen display device according to an exemplary embodiment.

FIG. 1 is a block diagram illustrating a touch screen display device according to an exemplary embodiment.

Referring to FIG. 1, a touch screen display device 100 may include a touch panel 110, a touch panel controller 120, and a display unit 130.

The touch panel 110 may be arranged on the display unit 130 and may generate touch signals in response to a user's touch operation on the touch panel 110. The touch panel controller 120 may generate a plurality of final coordinates based on the touch signals. The plurality of the final coordinates represent points on the touch panel 110 that are finally determined as the user's touch points. The display unit 130 may output an image inputted by the user's touch operation based on the plurality of the final coordinates.

When the user inputs an image, such as a character or a picture, on the touch panel 110 while keeping touch on the touch panel 110, the touch panel controller 120 may periodically generate the plurality of the final coordinates based on the touch signals.

The touch signals generated by the touch panel 110 may include noise inherently caused by the touch panel 110. Therefore, an image displayed by the display unit 130 may include a minute vibration or an abnormal distortion if the noise is not reduced. The touch panel controller 120 may generate the plurality of the final coordinates based on the touch signals by reducing the noise included in the touch signals, so that the display unit 130 may correctly display an image inputted by the user.

Hereinafter, methods of processing data to reduce noise in the touch screen display device will be described.

The methods of processing data may be performed in the touch panel controller 120.

Figure 2:
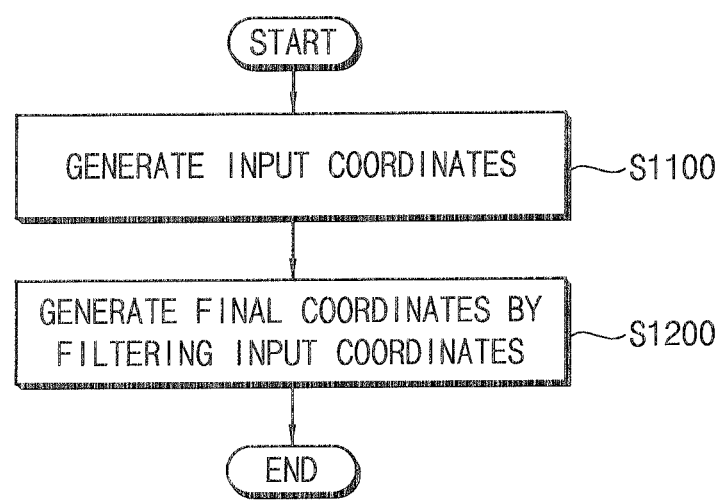
FIG. 2 is a flowchart illustrating a method of processing data in a touch screen display device according to an exemplary embodiment.

FIG. 2 is a flowchart illustrating a method of processing data in a touch screen display device according to an exemplary embodiment.

Referring to FIG. 2, a plurality of input coordinates are generated in response to the user's touch operation on the touch panel 110 (step S1100). The plurality of the input coordinates may be periodically generated when the user inputs an image on the touch panel 110 while keeping touch on the touch panel 110. The plurality of the final coordinates are generated by filtering the plurality of the input coordinates using a valid area (step S1200). As will be further described with reference to FIGS. 10 and 11, the valid area may be flexibly set based on a direction and a speed of the user's touch operation. Some of the plurality of the input coordinates may be selectively eliminated based on the valid area, and the input coordinates that are not eliminated may become the plurality of the final coordinates.

Figure 3A:
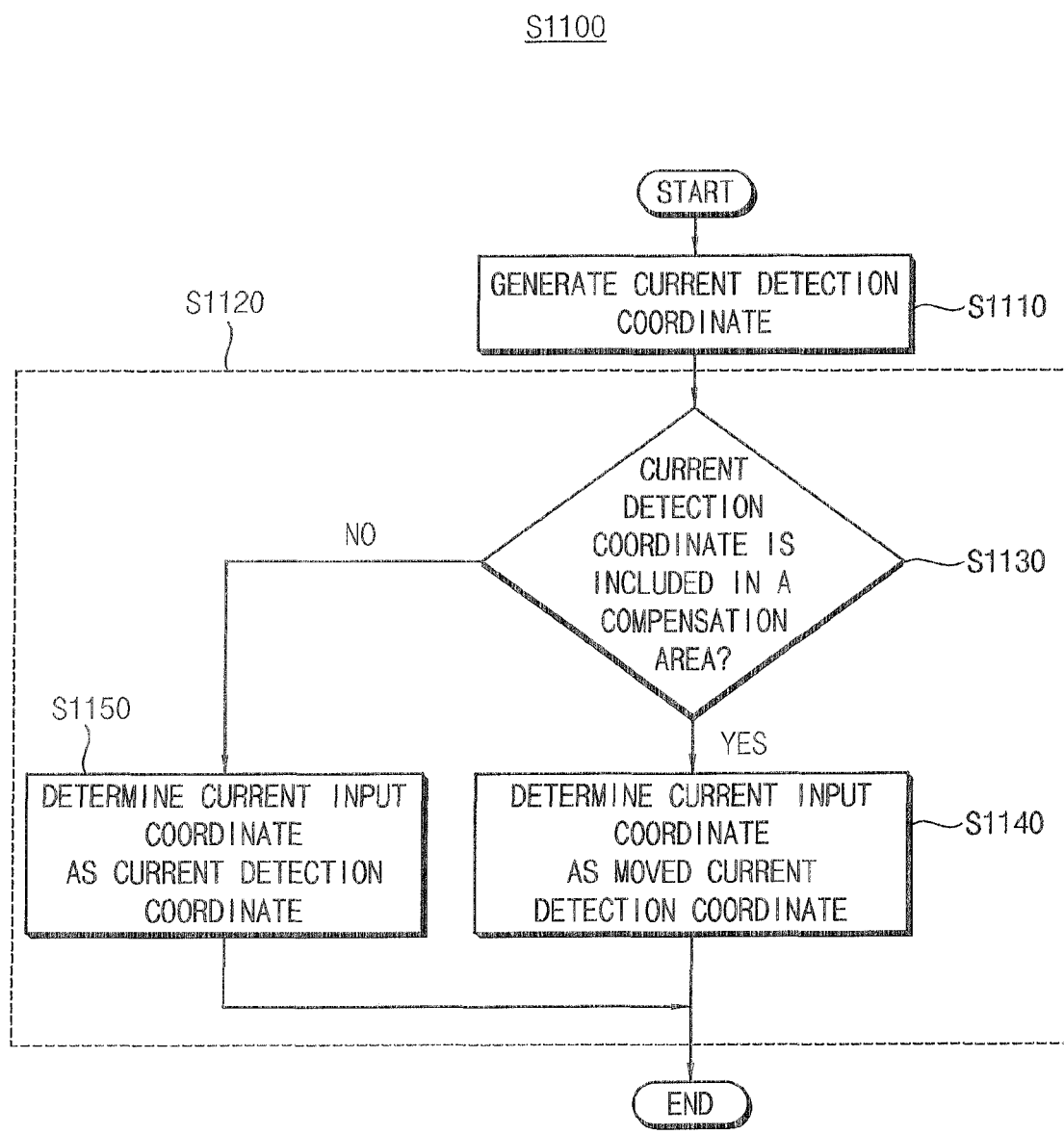
FIG. 3A is a flowchart illustrating an example of generating the plurality of input coordinates of FIG. 2.
Figure 3B:
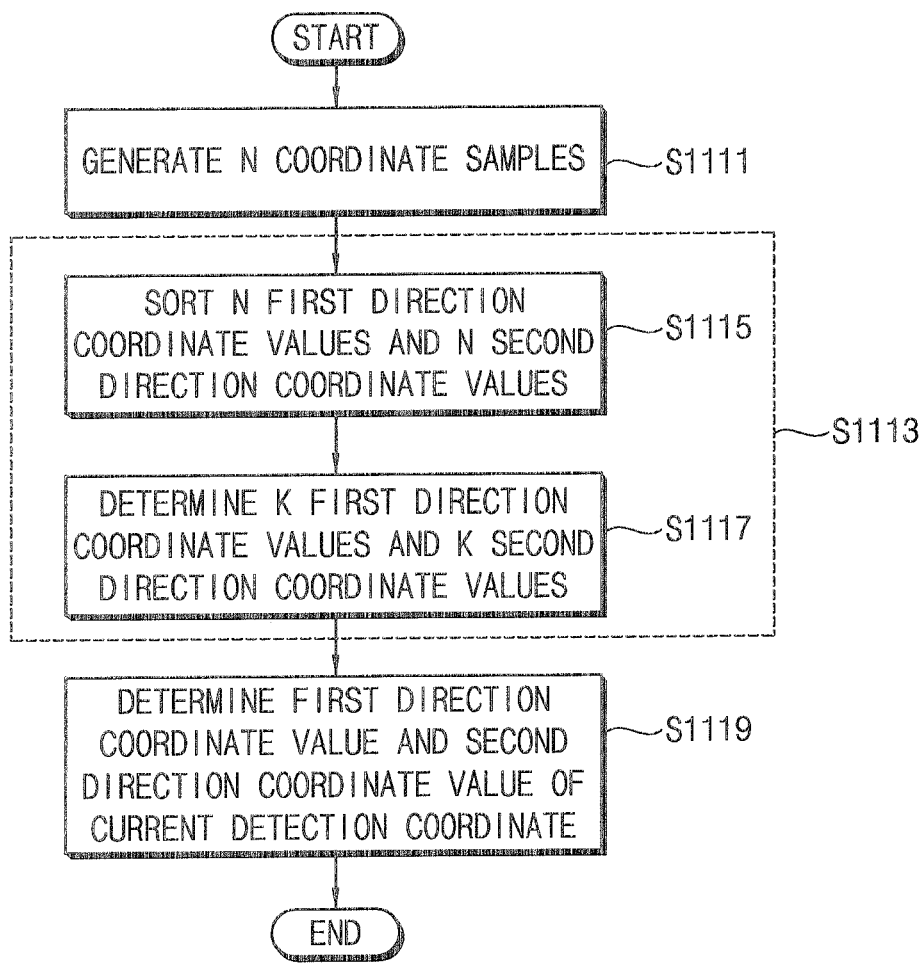
FIG. 3B is a flowchart illustrating an example of generating the current detection coordinate of FIG. 3A.

FIG. 3A is a flowchart illustrating an example of generating a plurality of input coordinates (step S1100) of FIG. 2. FIG. 3B is a flowchart illustrating an example of generating a current detection coordinate (step S1110) of FIG. 3A.

Referring to FIG. 3A, a current detection coordinate may be generated by detecting the user's touch point on the touch panel 110 (step S1110).

Referring to FIG. 3B, N (N is a positive integer) coordinate samples may be generated by sampling the user's touch point on the touch panel 110 N times (step S1111). To correctly determine the current detection coordinate representing the user's touch point, the user's touch point may be sampled N times and the N coordinate samples may be used to determine the current detection coordinate.

Each of the N coordinate samples may include a first direction coordinate value and a second direction coordinate value. The first direction may be defined as an x-axis direction and the second direction may be defined as a y-axis direction. The first direction coordinate value may be an x-coordinate value and the second direction coordinate value may be a y-coordinate value.

K first direction coordinate values and K second direction coordinate values (K is a positive integer smaller than or equal to N) may be selected from N first direction coordinate values and N second direction coordinate values included in the N coordinate samples, respectively (step S1113). For example, each of the N first direction coordinate values and the N second direction coordinate values may be sorted in an ascending order or in a descending order, respectively (step S1115). K median values of the sorted N first direction coordinate values may be determined as the K first direction coordinate values, and K median values of the sorted N second direction coordinate values may be determined as the K second direction coordinate values (step S1117).

A first direction coordinate value of the current detection coordinate may be determined as an arithmetic mean of the K first direction coordinate values, and a second direction coordinate value of the current detection coordinate may be determined as an arithmetic mean of the K second direction coordinate values (step S1119).

An example of generating the current detection coordinate (step S1110) in the case of N=8 and K=4 will be described below.

When nine coordinate samples are (x0, y0), (x1, y1), (x2, y2), (x3, y3), (x4, y4), (x5, y5), (x6, y6), (x7, y7), and (x8, y8), four first direction coordinate values selected from x0, x1, x2, x3, x4, x5, x6, x7, and x8 are xa1, xa2, xa3, and xa4 in a sorted order, and four second direction coordinate values selected from y0, y1, y2, y3, y4, y5, y6, y7, and y8 are yb1, yb2, yb3, and yb4 in the sorted order, the first direction coordinate value of the current detection coordinate may be determined by Equation 1 and the second direction coordinate value of the current detection coordinate may be determined by Equation 2.

$$xc = (xa1 + ((xa2 + xa3) << 1) + \quad\quad \text{[Equation 1]}$$
$$(xa2 + xa3) + xa4) >> 3$$
$$= (xa1 + 3*xa2 + 3*xa3 + xa4)/8$$

$$yc = (yb1 + ((yb2 + yb3) << 1) + \quad\quad \text{[Equation 2]}$$
$$(yb2 + yb3) + yb4) >> 3$$
$$= (yb1 + 3*yb2 + 3*yb3 + yb4)/8$$

In Equation 1 and Equation 2, xc represents the first direction coordinate value of the current detection coordinate and yc represents the second direction coordinate value of the current detection coordinate.

In Equation 1 and Equation 2, a weight value of three is applied to xa2, xa3, yb2, and yb3 to quickly calculate the first direction coordinate value xc and the second direction coordinate value yc of the current detection coordinate by using a shift operation.

According to an embodiment, the first direction coordinate value and the second direction coordinate value of the current detection coordinate may be generated using other weight values than three.

As described above with reference to FIG. 3B, the current detection coordinate representing the user's touch point may be correctly determined by sampling the user's touch point N times, selecting the K first direction coordinate values and the K second direction coordinate values, and averaging the K first direction coordinate values and the K second direction coordinate values.

Referring again to FIG. 3A, a current input coordinate may be generated based on whether the current detection coordinate is included in a compensation area a center of which is located at a most recent final coordinate (step S1120). The most recent final coordinate represents a most recently generated final coordinate among the plurality of the final coordinates. The size of the compensation area is predetermined.

While generating the current input coordinate, whether the current detection coordinate is included in the compensation area may be determined (step S1130). If the current detection coordinate is included in the compensation area, the current detection coordinate may be moved such that a distance between the current detection coordinate and the most recent final coordinate is reduced, and the current input coordinate may be determined as the moved current detection coordinate (step S1140). If the current detection coordinate is excluded from the compensation area, the current input coordinate may be determined as the current detection coordinate without movement (step S1150).

Figure 4A:
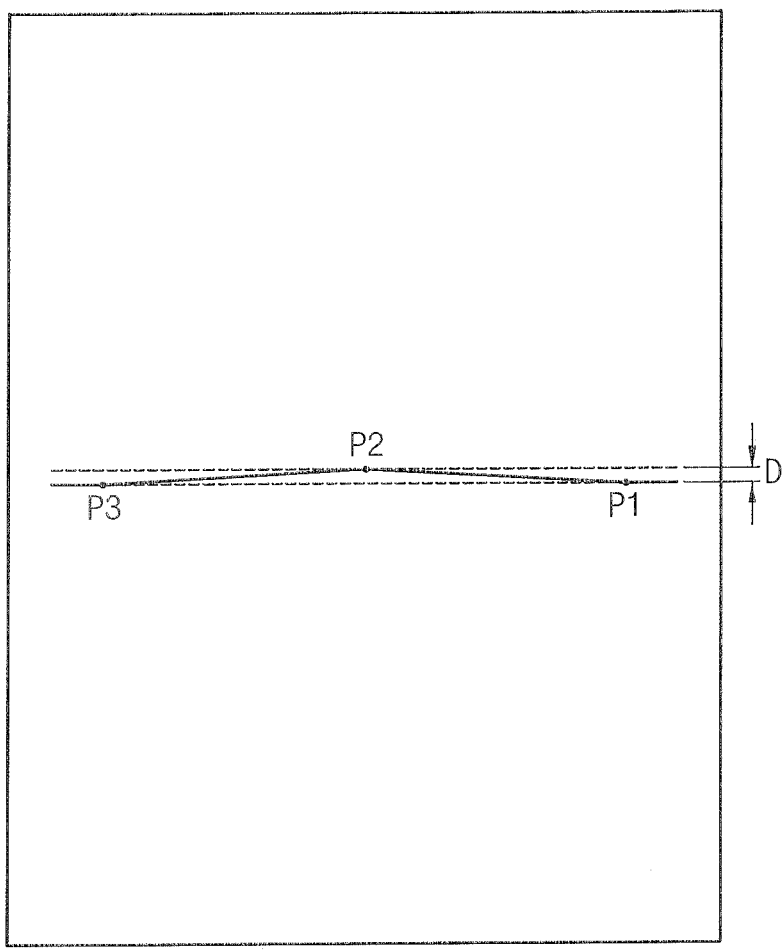
FIG. 4A is a diagram illustrating an example of an output image of a touch screen display device when a user quickly inputs a horizontal straight line.
Figure 4B:
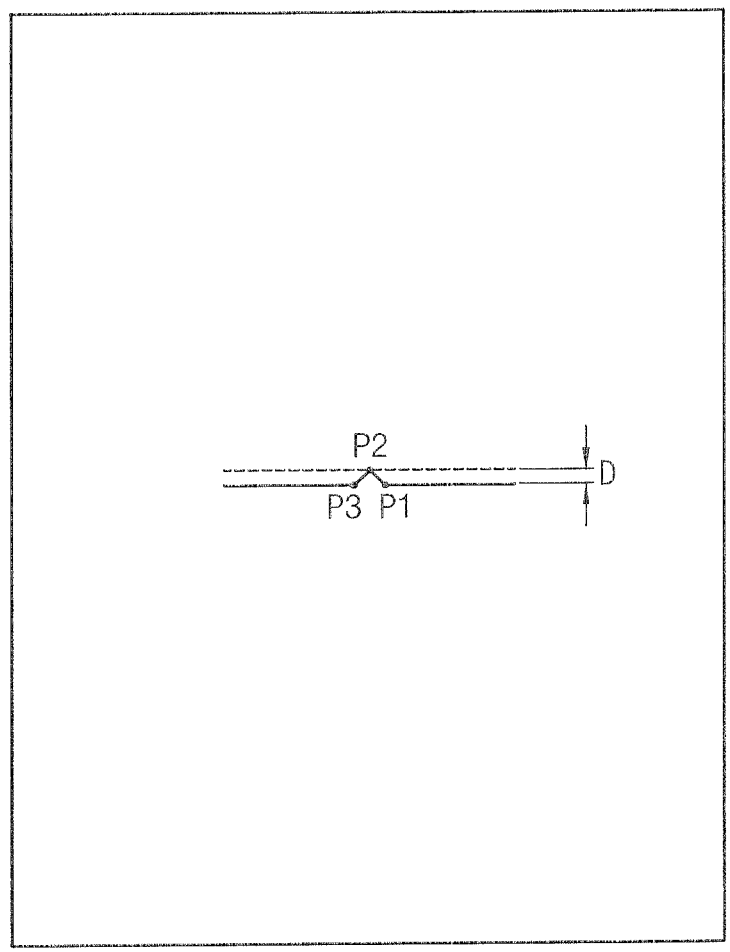
FIG. 4B is a diagram illustrating an example of an output image of a touch screen display device when a user slowly inputs a horizontal straight line.

FIG. 4A is a diagram illustrating an example of an output image of a touch screen display device when a user quickly inputs a horizontal straight line. FIG. 4B is a diagram illustrating an example of an output image of a touch screen display device when a user slowly inputs a horizontal straight line.

In FIGS. 4A and 4B, coordinate P1 represents the most recent final coordinate, coordinate P2 represents a most recently generated final coordinate among the final coordinates generated before the coordinate P1 is generated, and coordinate P3 represents a most recently generated final coordinate among the final coordinates generated before the coordinate P2 is generated.

As shown in FIGS. 4A and 4B, the output image is distorted by the coordinate P2 since the coordinate P2 is determined as a point apart from the inputted horizontal straight line along y-axis by a distance D due to noise.

Comparing FIG. 4A with FIG. 4B, when a distance between the coordinate P3 and the coordinate P2 is relatively short, the distortion of the output image is clearly recognized as a minute vibration, as illustrated in FIG. 4B, but when the distance between the coordinate P3 and the coordinate P2 is relatively long, the distortion of the output image is not clearly recognized, as illustrated in FIG. 4A.

Therefore, only when the current detection coordinate is included in the compensation area, the current detection coordinate may be corrected to generate the current input coordinate. That is, when the current detection coordinate is in the vicinity of the most recent final coordinate, the current detection coordinate may be moved such that a distance between the current detection coordinate and the most recent final coordinate is reduced to eliminate the minute vibration. When the current detection coordinate is not in the vicinity of the most recent final coordinate, the current detection coordinate may be determined as the current input coordinate without movement since the operating speed of the touch screen display device is not slow and thus the distortion of the output image is not clearly recognized.

Figure 5A:
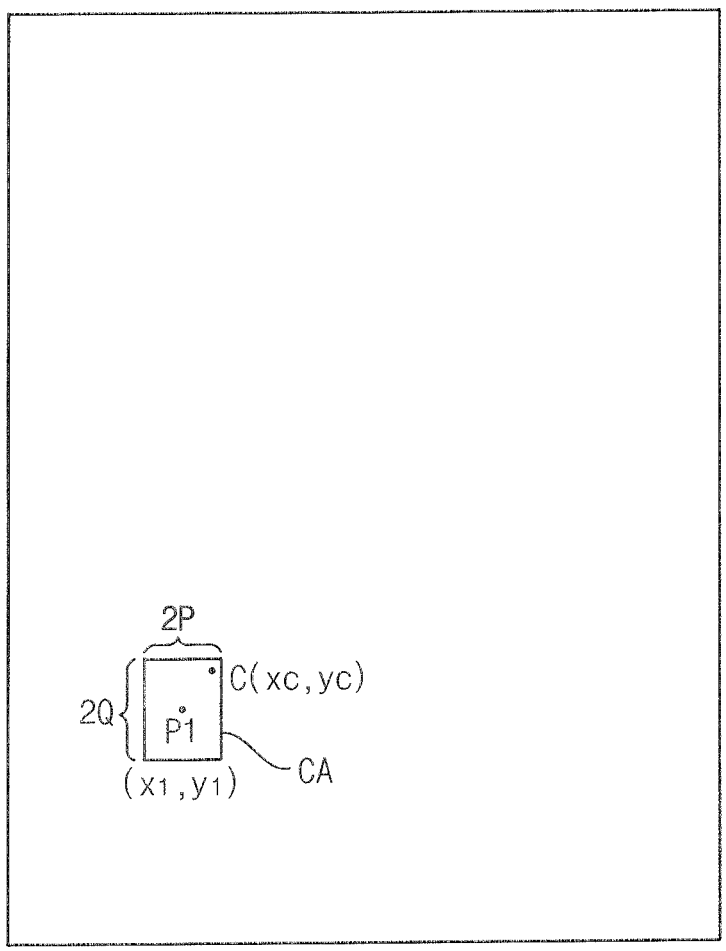
FIG. 5A is a diagram for describing an example of generating the current input coordinate of FIG. 3A.

FIG. 5A is a diagram illustrating an example of generating the current input coordinate (step S1120) of FIG. 3A.

In FIG. 5A, coordinate P1 represents the most recent final coordinate and coordinate C represents the current detection coordinate. The compensation area CA may be set to have a rectangular shape the center of which is located at the most recent final coordinate. The compensation area CA may have a size of 2P (P is a positive integer) by 2Q (Q is a positive integer).

For example, when the touch panel 110 includes 480 pixels in the x-axis and 800 pixels in the y-axis, the size of the compensation area CA may be set as 64 pixels by 128 pixels. That is, P may be set as 32 and Q may be set as 64.

Whether the current detection coordinate C is included in the compensation area CA may be determined by Equation 3.

$$(|x1-xc|<=P) \text{ and } (|y1-yc|<=Q) \qquad \text{[Equation 3]}$$

In Equation 3, (x1, y1) represents the most recent final coordinate P1 and (xc, yc) represents the current detection coordinate C.

When Equation 3 is satisfied, the current detection coordinate C is determined to be included in the compensation area CA, the current detection coordinate may be moved such that a distance between the current detection coordinate and the most recent final coordinate is reduced, and the current input coordinate may be determined as the moved current detection coordinate.

When Equation 3 is not satisfied, the current detection coordinate C is determined to be excluded from the compensation area CA, and the current input coordinate may be determined as the current detection coordinate without movement.

Figure 5B:
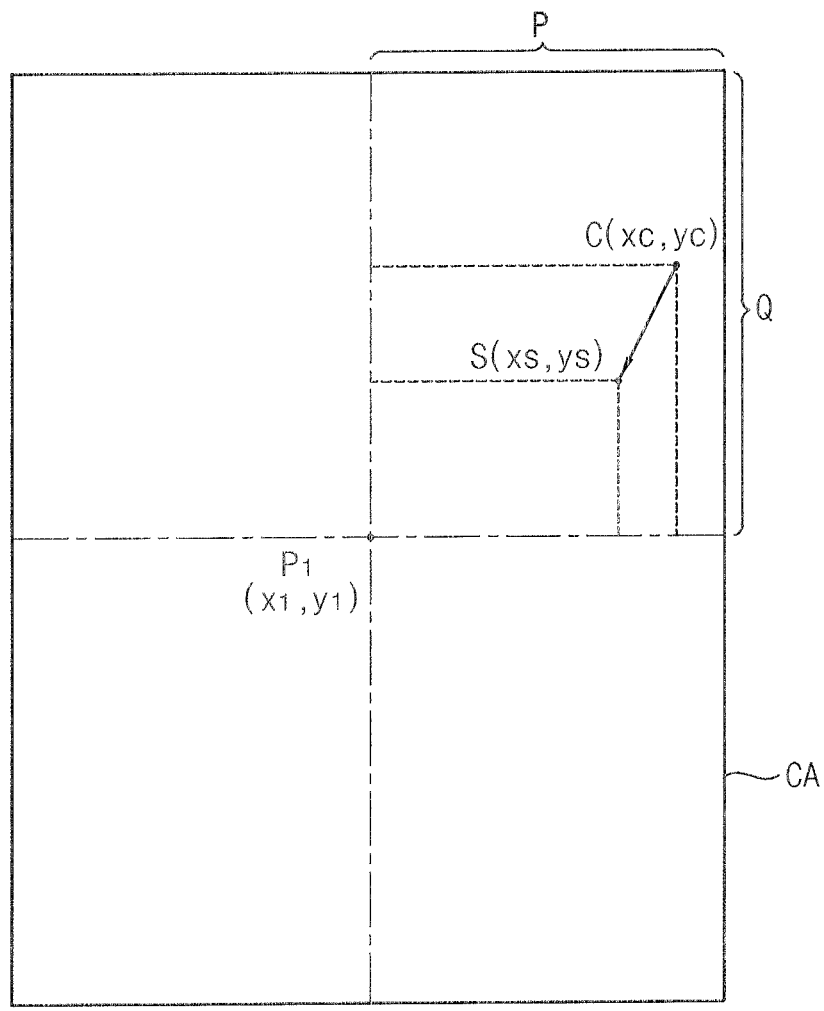
FIG. 5B is a diagram for describing an example of determining a current input coordinate as the moved current detection coordinate of FIG. 3A.

FIG. 5B is a diagram illustrating an example of determining a current input coordinate as a moved current detection coordinate (step S1140) of FIG. 3A.

In FIG. 5B, coordinate P1 represents the most recent final coordinate, coordinate C represents the current detection coordinate, and coordinate S represents the moved current detection coordinate, which is determined as the current input coordinate.

Referring to FIG. 5B, the current input coordinate S may be determined by moving the current detection coordinate C such that a distance between the current detection coordinate C and the most recent final coordinate P1 is reduced. For example, the current input coordinate S may be determined by Equation 4 and Equation 5.

$$|xs-x1|:|xc-x1|=|xc-x1|:P \qquad \text{[Equation 4]}$$

$$|ys-y1|:|yc-y1|=|yc-y1|:Q \qquad \text{[Equation 5]}$$

In Equation 4 and Equation 5, (x1, y1) represents the most recent final coordinate P1, (xc, yc) represents the current detection coordinate C, and (xs, ys) represents the current input coordinate S.

That is, the x-coordinate value of the current input coordinate S may be determined such that a ratio of a distance between the current input coordinate S and the most recent final coordinate P1 in x-axis to a distance between the current detection coordinate C and the most recent final coordinate P1 in x-axis substantially equals a ratio of a distance between the current detection coordinate C and the most recent final coordinate P1 in x-axis to a half of the length of the compensation area CA in x-axis. The Y-coordinate value of the current input coordinate S may be determined such that a ratio of a distance between the current input coordinate S and the most recent final coordinate P1 in y-axis to a distance between the current detection coordinate C and the most recent final coordinate P1 in y-axis substantially equals a ratio of a distance between the current detection coordinate C and the most recent final coordinate P1 in y-axis to a half of the length of the compensation area CA in y-axis.

As shown in FIGS. 5A and 5B, the compensation area CA may have a rectangular shape. According to an embodiment, the compensation area CA may have other shapes than a rectangular shape, such as a circular shape or an oval shape.

Figure 6A:
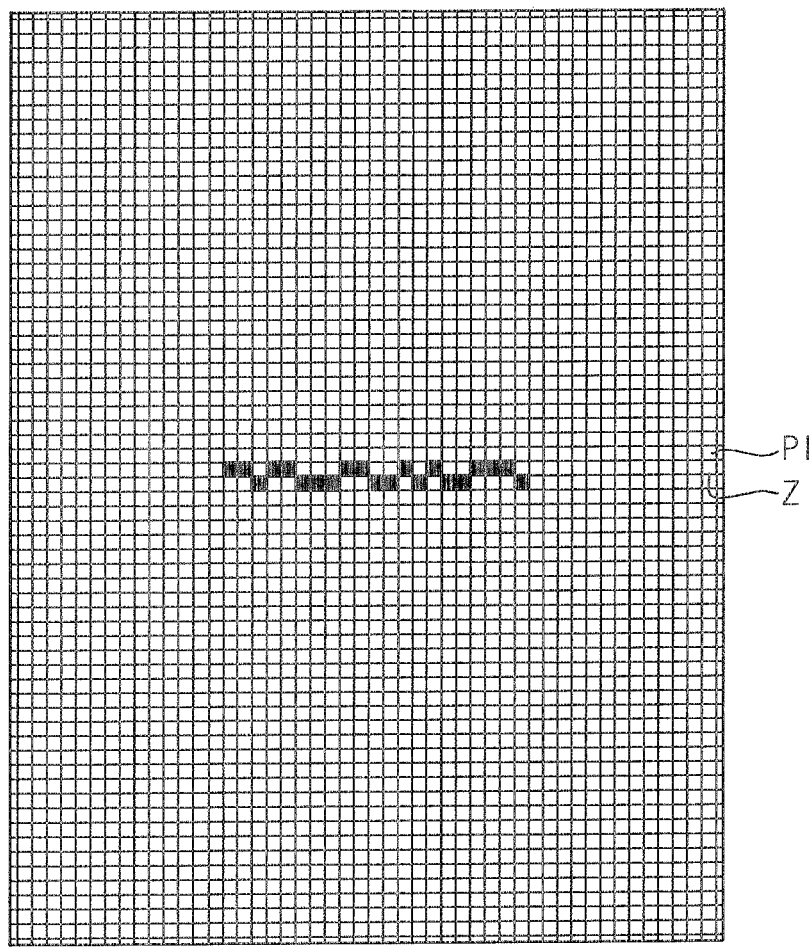
FIG. 6A is a diagram illustrating an example of an output image of a touch screen display device when the process of FIG. 3A is not applied.
Figure 6B:
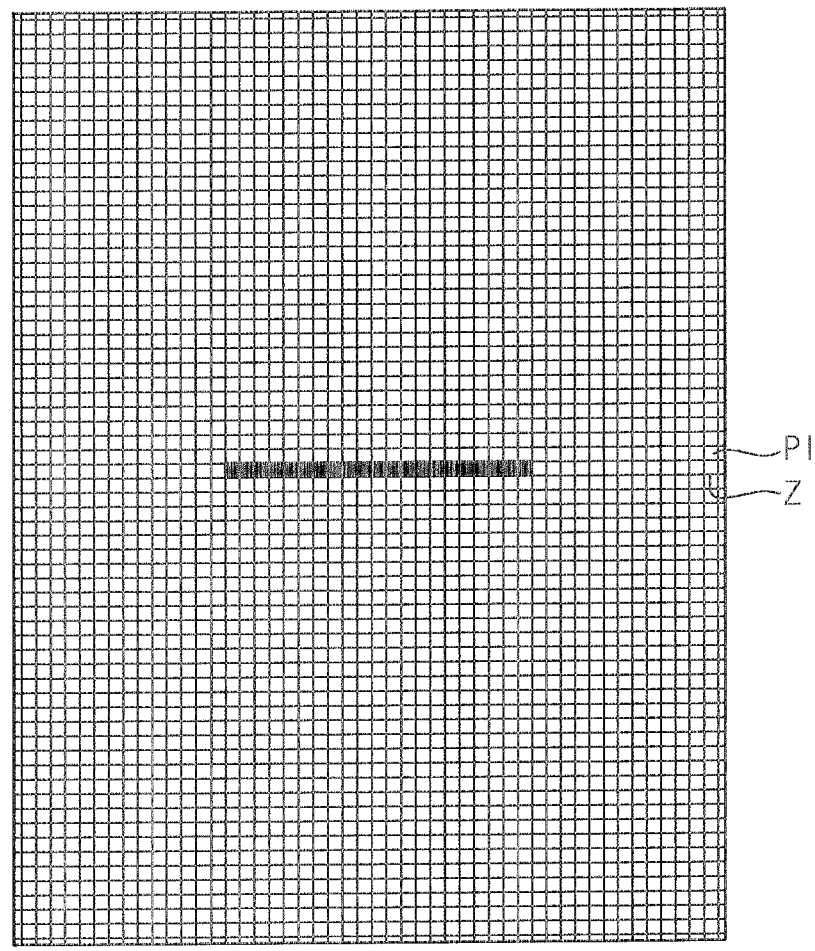
FIG. 6B is a diagram illustrating an example of an output image of a touch screen display device when the process of FIG. 3A is applied.

FIG. 6A is a diagram illustrating an example of an output image of a touch screen display device when the process of FIG. 3A is not applied. FIG. 6B is a diagram illustrating an example of an output image of a touch screen display device when the process of FIG. 3A is applied.

In FIGS. 6A and 6B, each square PI represents a pixel of the touch screen display device.

When a user draws a horizontal straight line along a line Z, which is a border line between pixels, the current detection coordinate may be randomly determined as a pixel over the line Z or a pixel under the line Z due to noise.

Referring to FIG. 6A, when the process of FIG. 3A is not applied, the current input coordinate may be determined as the current detection coordinate without movement. Therefore, the output image may have a minute vibration.

Referring to FIG. 6B, when the process of FIG. 3A is applied, the current detection coordinate may be moved such that a distance between the current detection coordinate and the most recent final coordinate is reduced, and the current input coordinate may be determined as the moved current detection coordinate. Therefore, the output image does not have a minute vibration since noise is reduced.

As shown in FIG. 6B, the output image is displayed on the pixels over the line Z. According to an embodiment, the output image may be displayed on the pixels under the line Z when a first pixel of the output image is determined as a pixel under the line Z.

As described above with reference to FIGS. 2, 3A, 3B, 4A, 4B, 5A, 5B, 6A, and 6B, in the method of processing data to reduce noises in a touch screen display device according to exemplary embodiments, the touch screen display device may eliminate a minute vibration from the output image without degrading the operating speed of the touch screen display device by selectively moving the current detection coordinate based on a distance between the current detection coordinate and the most recent final coordinate to generate the current input coordinate.

Figure 7:
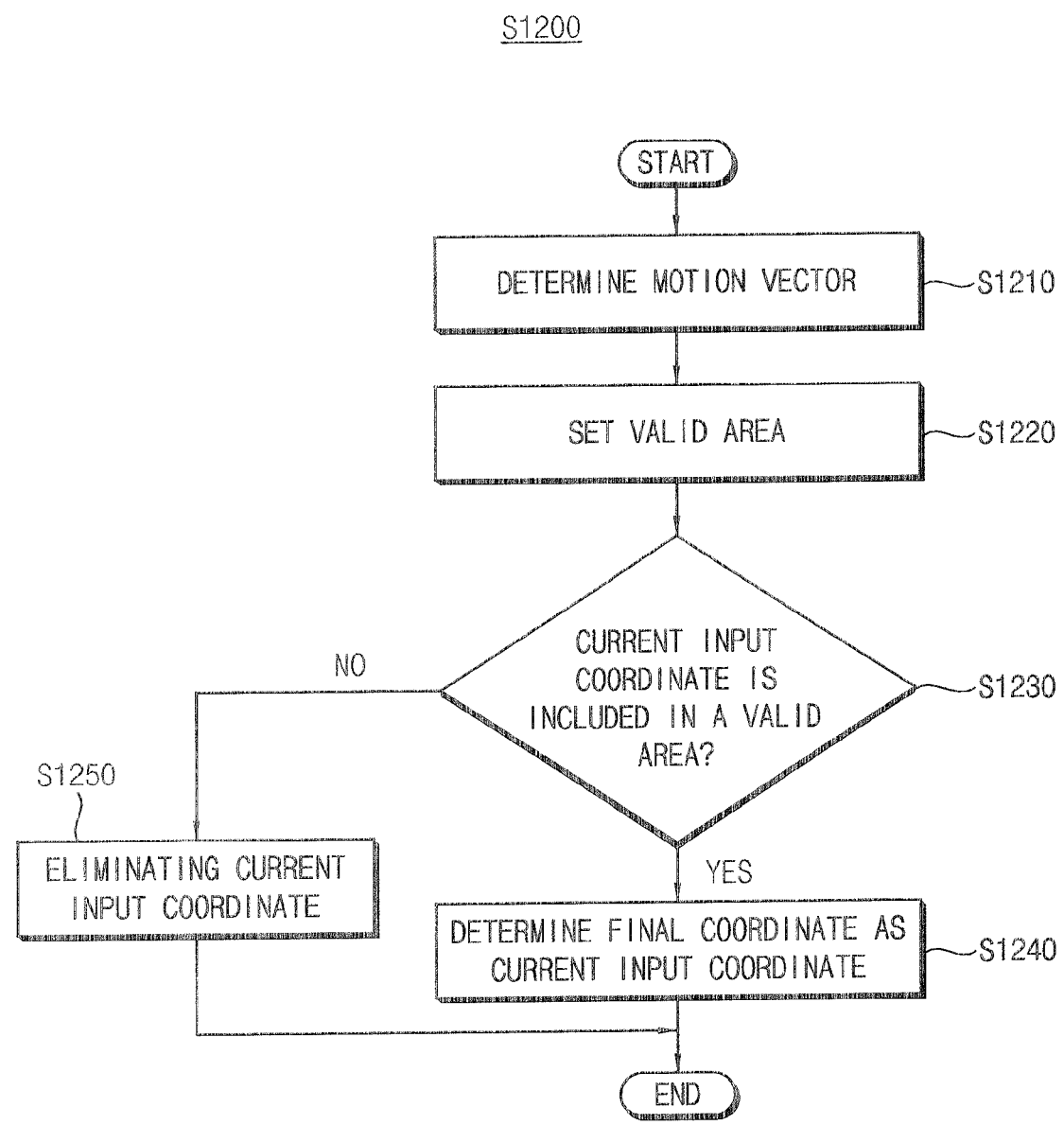
FIG. 7 is a flowchart illustrating an example of generating the plurality of final coordinates of FIG. 2.

FIG. 7 is a flowchart illustrating an example of generating a plurality of final coordinates (step S1200) of FIG. 2.

Referring to FIG. 7, a motion vector representing the user's touch operation on the touch panel 110 may be determined based on previously generated final coordinates (step S1210). The valid area may be set based on the motion vector (step S1220). Whether the current input coordinate is included in the valid area may be determined (step S1230). If the current input coordinate is included in the valid area, a final coordinate may be determined as the current input coordinate (step S1240). If the current input coordinate is excluded from the valid area, the current input coordinate may be eliminated without determining the final coordinate since the current input coordinate may be an abnormal coordinate caused by noise (step S1250).

While generating the plurality of the final coordinates (step S1200), if the number of the previously generated final coordinates is less than one, the current input coordinate may be determined as the final coordinate.

Figure 8:
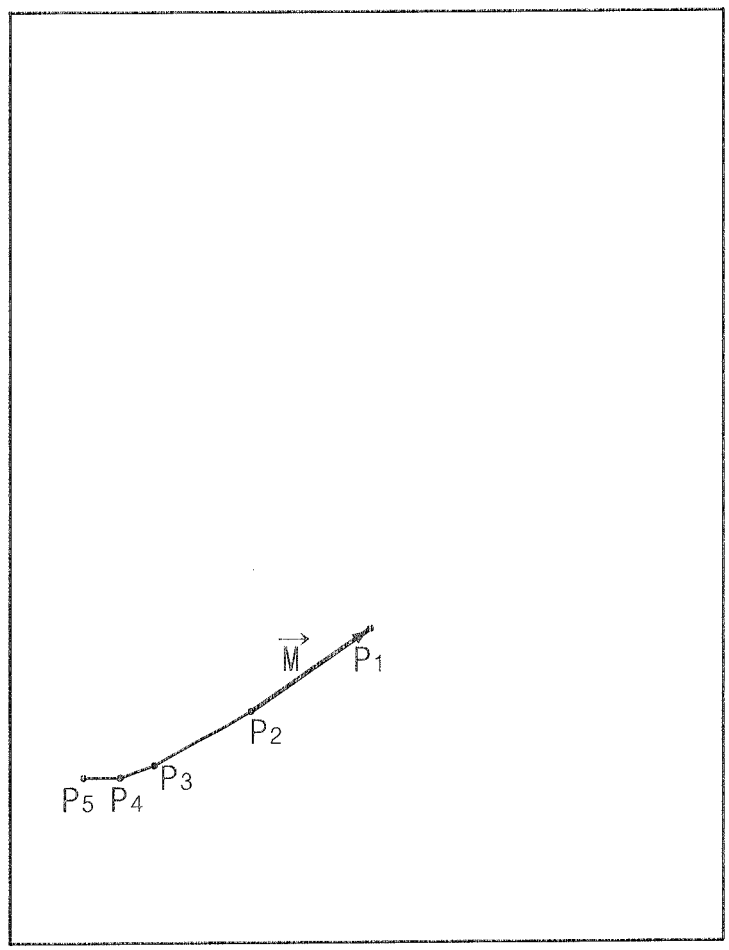
FIG. 8 is a diagram for describing an example of determining the motion vector of FIG. 7.

FIG. 8 is a diagram illustrating an example of determining a motion vector (step S1210) of FIG. 7.

In FIG. 8, coordinate P1 represents the most recent final coordinate, coordinate P2 represents a most recently generated final coordinate among the final coordinates generated before the coordinate P1 is generated, coordinate P3 represents a most recently generated final coordinate among the final coordinates generated before the coordinate P2 is generated, coordinate P4 represents a most recently generated final coordinate among the final coordinates generated before the coordinate P3 is generated, and coordinate P5 represents a most recently generated final coordinate among the final coordinates generated before the coordinate P4 is generated.

Referring to FIG. 8, the motion vector may be determined as a vector M having a start point at the coordinate P2 and having an end point at the most recent final coordinate P1.

The motion vector may represent a direction and a speed of the user's touch operation on the touch panel 110.

Figure 9:
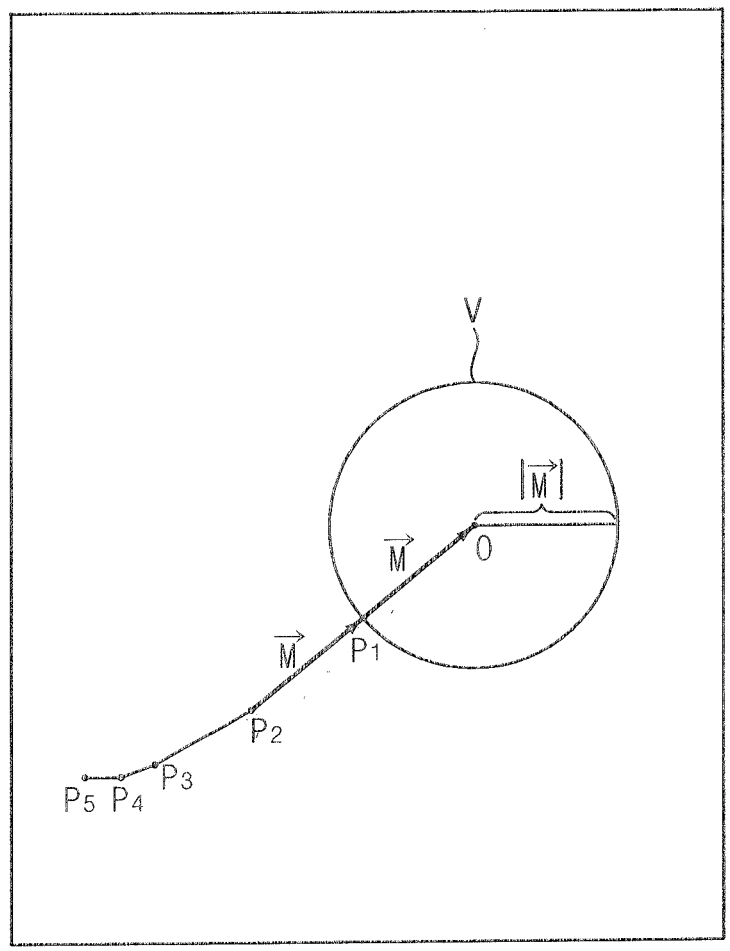
FIGS. 9, 10 and 11 are diagrams for describing an example of setting the valid area of FIG. 7.
Figure 10:
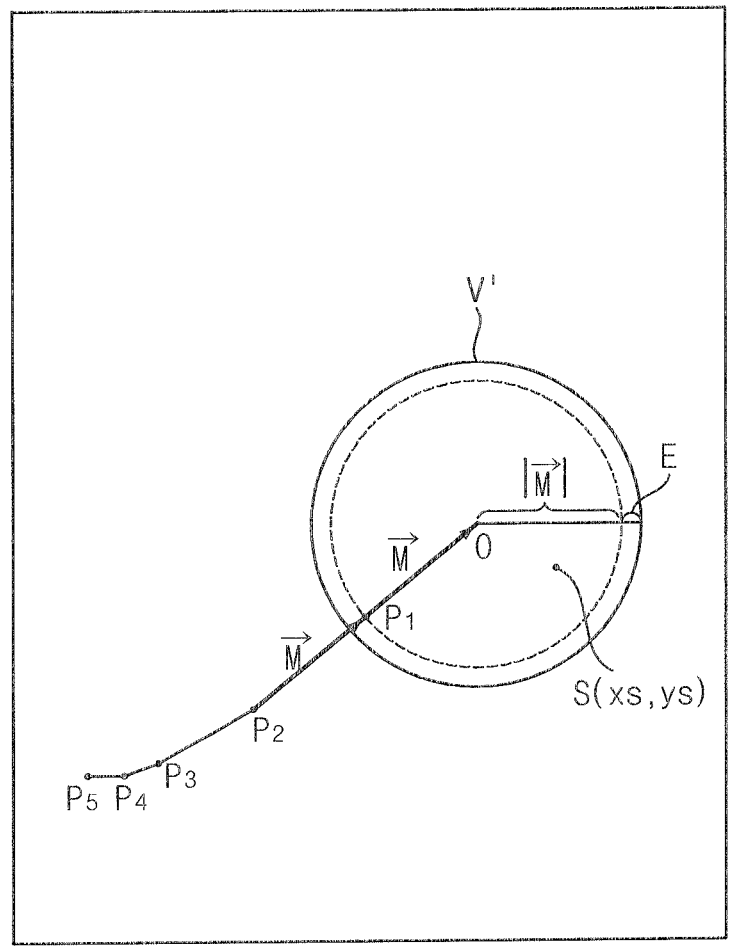
Figure 11:
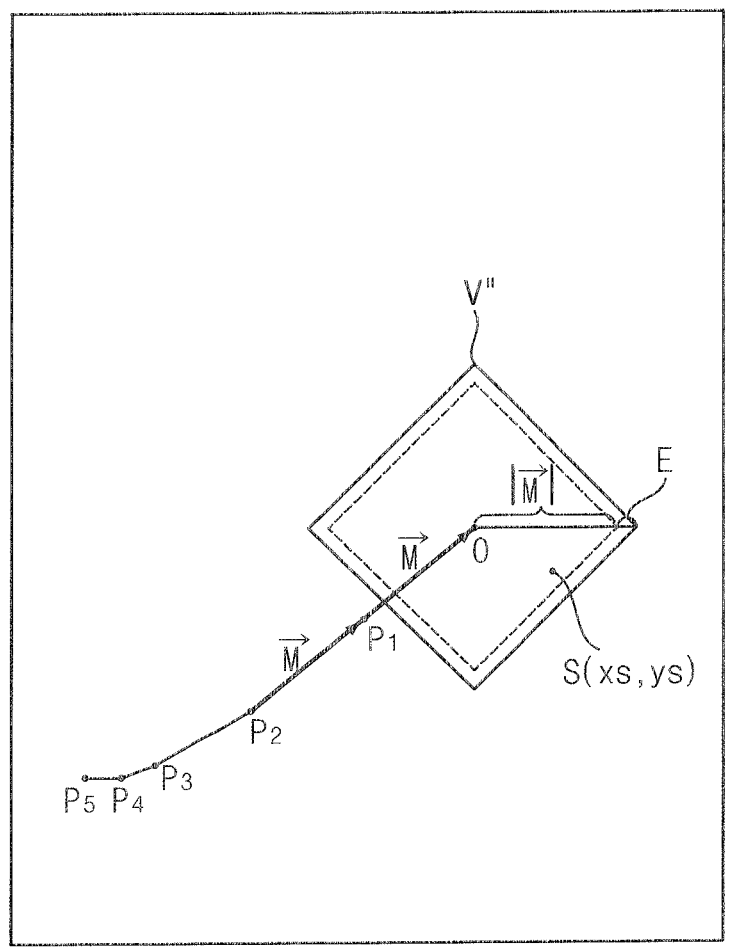

FIGS. 9, 10, and 11 are diagrams for describing an example of setting a valid area (step S1220) of FIG. 7.

In FIGS. 9, 10, and 11, coordinate P1 represents the most recent final coordinate, coordinate P2 represents a most recently generated final coordinate among the final coordinates generated before the coordinate P1 is generated, coordinate P3 represents a most recently generated final coordinate among the final coordinates generated before the coordinate P2 is generated, coordinate P4 represents a most recently generated final coordinate among the final coordinates generated before the coordinate P3 is generated, and coordinate P5 represents a most recently generated final coordinate among the final coordinates generated before the coordinate P4 is generated.

Referring to FIG. 9, a circle shape V may be considered as the valid area. A center O of the circle shape V is an end point of the motion vector M having a start point at the most recent final coordinate P1, and a radius of the circle shape V is equal to a length of the motion vector |M|.

In this case, when the user starts to input an image after stopping at the coordinate P1 while keeping touch on the touch panel 110, the length of the motion vector |M| becomes zero since the same most recent final coordinate P1 equals to the same as the coordinate P2. Therefore, a size of the valid area becomes zero.

FIGS. 10 and 11 illustrate methods of setting a valid area according to an exemplary embodiment.

In FIGS. 10 and 11, coordinate S represents the current input coordinate.

Referring to FIG. 10, the valid area may be set to have a circle shape V'. A center O of the valid area V' is an end point of the motion vector M having a start point at the most recent final coordinate P1, and a radius of the valid area V' is equal to a length of the motion vector |M| plus a predetermined number E (E is a positive integer).

When the valid area is set as illustrated in FIG. 10, whether the current input coordinate is included in the valid area may be determined by comparing an Euclidean distance between the center O of the valid area V' and the current input coordinate S with the length of the motion vector |M| plus the predetermined number E.

Referring to FIG. 11, the valid area may be set as a diamond shape V". A center O of the valid area V" is an end point of the motion vector M having a start point at the most recent final coordinate P1, and a distance between the center O and each vertex of the valid area V" is equal to a length of the motion vector plus the predetermined number E.

When the valid area is set as illustrated in FIG. 11, whether the current input coordinate is included in the valid area may be determined by comparing an Manhattan distance between the center O of the valid area V" and the current input coordinate S with an Manhattan distance between the center O of the valid area V" and the vertex of the valid area V".

That is, if Equation 6 is satisfied, the current input coordinate may be determined to be included in the valid area and the final coordinate may be determined as the current input coordinate. If Equation 6 is not satisfied, the current input coordinate may be determined to be excluded from the valid area and the current input coordinate may be eliminated without determining the final coordinate since the current input coordinate may be an abnormal coordinate caused by noise.

$$|xs-xo|+|ys-yo|<=|M|+E \quad \text{[Equation 6]}$$

In Equation 6, (xo, yo) represents the center O of the valid area V" and (xs, ys) represents the current input coordinate.

In general, when the user continuously inputs an image on the touch panel 110, the user's next touch point may be determined based on a direction and a speed of the user's touch operation. That is, according to the law of inertia, when the user inputs an image on the touch panel 110, the current input coordinate may be likely to be located in the direction of the motion vector M from the most recent final coordinate, and as the user's touch operation is faster (that is, as the length of the motion vector |M| is increased), the current input coordinate may be likely to be located in a larger area.

As illustrated above with reference to FIGS. 2, 7, 8, 9, 10, and 11, in the method of processing data to reduce noise in a touch screen display device according to exemplary embodiments, the touch screen display device may prevent an abnormal distortion of an image, which usually occurs when noise is not reduced, by filtering the plurality of the input coordinates using the valid area flexibly set based on a direction and a speed of the user's touch operation.

Figure 12:
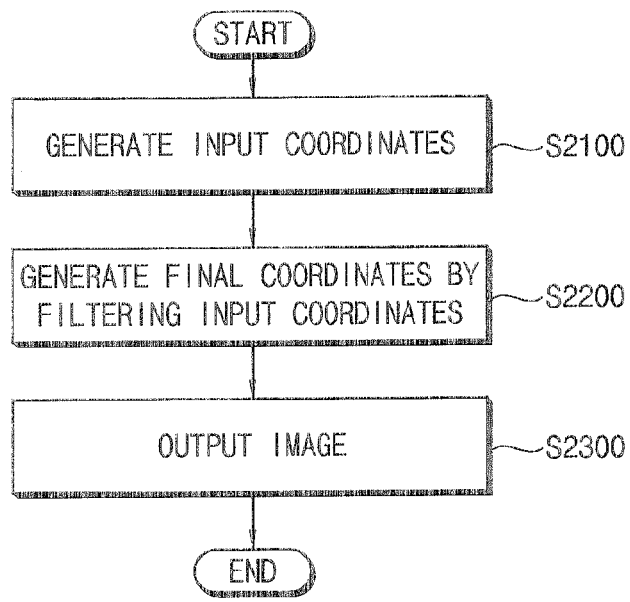
FIG. 12 is a flowchart illustrating a method of displaying an image in a touch screen display device according to an exemplary embodiment.

FIG. 12 is a flowchart illustrating a method of displaying an image in a touch screen display device according to an exemplary embodiment.

Referring to FIG. 12, a plurality of the input coordinates are generated in response to the user's touch operation on the touch panel 110 (step S2100). The plurality of the input coordinates may be periodically generated when the user inputs an image on the touch panel 110 while keeping touch on the touch panel 110. While generating each of the plurality of the input coordinates, the current detection coordinate may be generated by detecting the user's touch point on the touch panel 110. If the current detection coordinate is included in a compensation area a center of which is located at the most recent final coordinate, the current detection coordinate may be moved such that a distance between the current detection coordinate and the most recent final coordinate is reduced, and the current input coordinate may be determined as the moved current detection coordinate. If the current detection coordinate is excluded from the compensation area, the current input coordinate may be determined as the current detection coordinate without movement. Generating the plurality of the input coordinates (step S2100) may be performed similarly to generating the plurality of input coordinates (step S1100) of FIG. 2, and thus, a detailed description of generating the plurality of the input coordinates (step S2100) will be omitted.

A plurality of the final coordinates are generated by filtering the plurality of the input coordinates using a valid area flexibly set based on a direction and a speed of the user's touch operation (step S2200). Some of the plurality of the input coordinates may be selectively eliminated based on the valid area, and the input coordinates that are not eliminated may become the plurality of the final coordinates. While generating the plurality of the final coordinates, a motion vector representing the user's touch operation on the touch panel 110 may be determined based on the previously generated final coordinates and the valid area may be set based on the motion vector. If the current input coordinate is included in the valid area, the final coordinate may be determined as the current input coordinate. If the current input coordinate is excluded from the valid area, the current input coordinate may be eliminated without determining the final coordinate since the current input coordinate may be an abnormal coordinate caused by noise. Generating the plurality of the final coordinates (step S2200) may be performed similarly to generating the plurality of the final coordinates (step S1200) of FIG. 2, and thus, a detailed description of generating the plurality of the final coordinates (step S2200) will be omitted.

The image inputted by the user's touch operation is outputted by the display unit 130 based on the plurality of the final coordinates (step S2300). For example, the touch screen display device may display the inputted image by a line connecting a currently generated final coordinate with the most recent final coordinate.

The method of displaying an image as shown in FIG. 12 may be used in any touch screen display devices, such as laptop computers, mobile phones, personal digital assistants (PDAs), etc. The method of displaying an image as shown in FIG. 12 may be used in a touch screen display device having any type of touch panel, such as a resistive touch panel, a capacitive touch panel, etc.

Figure 13:
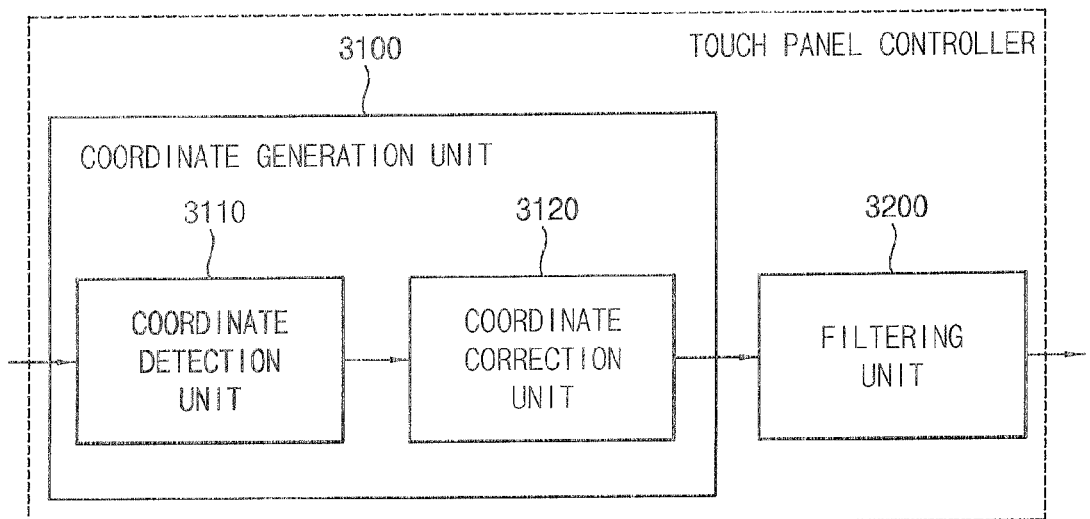
FIG. 13 is a block diagram illustrating an example of the touch panel controller of FIG. 1.

FIG. 13 is a block diagram illustrating an example of the touch panel controller of FIG. 1.

Referring to FIG. 13, a touch panel controller 3000 may include a coordinate generation unit 3100 and a filtering unit 3200.

The coordinate generation unit 3100 may receive touch signals from the touch panel 110 and generate a plurality of input coordinates representing user's touch points on the touch panel 110 (step S1110). The plurality of the input coordinates may be periodically generated when the user inputs an image on the touch panel 110 while keeping touch on the touch panel 110.

The filtering unit 3200 may generate a plurality of the final coordinates by filtering the plurality of the input coordinates using the valid area flexibly set based on a direction and a speed of the user's touch operation (step S1200). The filtering unit 3200 may selectively eliminate some of the plurality of the input coordinates based on the valid area, and determine the plurality of the final coordinates as the input coordinates that are not eliminated.

The coordinate generation unit 3100 may include a coordinate detection unit 3110 and a coordinate correction unit 3120.

The coordinate detection unit 3110 may generate a current detection coordinate by detecting the user's touch point on the touch panel 110 (step S1110). The coordinate correction unit 3120 may generate the current input coordinate based on whether the current detection coordinate received from the coordinate detection unit 3110 is included in the compensation area (step S1120). The center of the compensation area is located at the most recent final coordinate, which represents a most recently generated final coordinate among the plurality of the final coordinate, and the size of the compensation area is predetermined.

Figure 14:
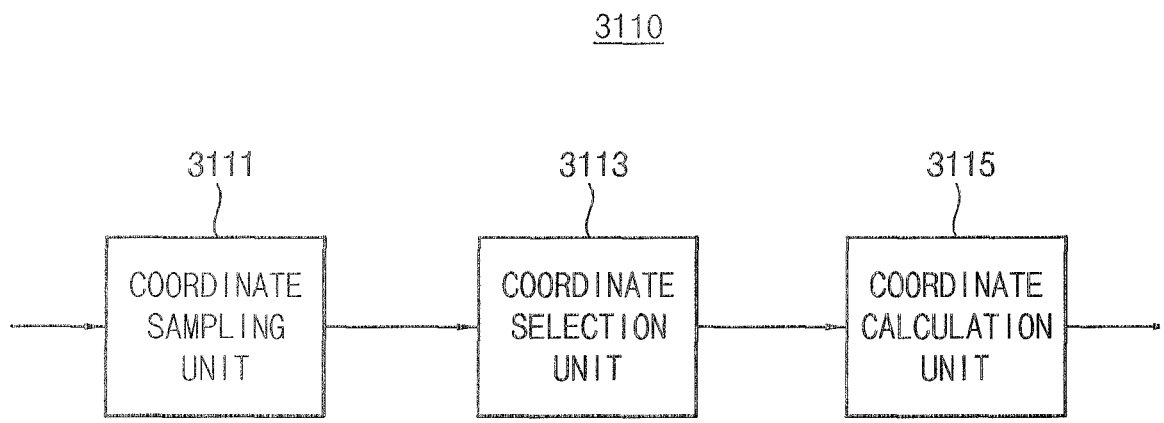
FIG. 14 is a block diagram illustrating an example of the coordinate detection unit of FIG. 13.

FIG. 14 is a block diagram illustrating an example of the coordinate detection unit 3110 of FIG. 13.

Referring to FIG. 14, the coordinate detection unit 3110 may include a coordinate sampling unit 3111, a coordinate selection unit 3113, and a coordinate calculation unit 3115.

The coordinate sampling unit 3111 may generate N coordinate samples by sampling the user's touch point on the touch panel 110 N times (step S1111) to correctly determine the current detection coordinate representing the user's touch point.

Each of the N coordinate samples may include a first direction coordinate value and a second direction coordinate value. The first direction may be defined as an x-axis direction and the second direction may be defined as a y-axis direction. The first direction coordinate value may be an x-coordinate value and the second direction coordinate value may be a y-coordinate value.

The coordinate selection unit 3113 may select K first direction coordinate values and K second direction coordinate values from N first direction coordinate values and N second direction coordinate values included in the N coordinate samples, respectively (step S1113). For example, the coordinate selection unit 3113 may sort the N first direction coordinate values and the N second direction coordinate values in an ascending order or in a descending order, respectively (step S1115). The coordinate selection unit 3113 may determine the K first direction coordinate values as K median values of the sorted N first direction coordinate values, and determine the K second direction coordinate values as K median values of the sorted N second direction coordinate values (step S1117).

The coordinate calculation unit 3115 may receive the K first direction coordinate values and the K second direction coordinate values from the coordinate selection unit 3113, determine a first direction coordinate value of the current detection coordinate as an arithmetic mean of the K first direction coordinate values, and determine a second direction coordinate value of the current detection coordinate as an arithmetic mean of the K second direction coordinate values (step S1119).

Figure 15:
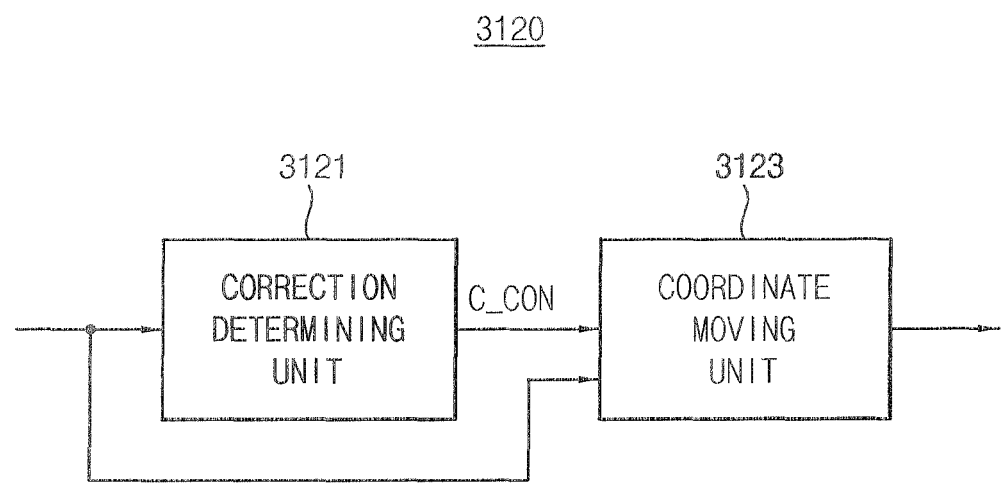
FIG. 15 is a block diagram illustrating an example of the coordinate correction unit of FIG. 13.

FIG. 15 is a block diagram illustrating an example of the coordinate correction unit 3120 of FIG. 13.

Referring to FIG. 15, the coordinate correction unit 3120 may include a correction determining unit 3121 and a coordinate moving unit 3123.

The correction determining unit 3121 may receive the current detection coordinate from the coordinate detection unit 3110 and generate a correction control signal C_CON based on whether the current detection coordinate is included in the compensation area (step S1130). The center of the compensation area is located at the most recent final coordinate, which represents a most recently generated final coordinate among the plurality of the final coordinates, and the size of the compensation area is predetermined. The correction determining unit 3121 may generate the correction control signal C_CON having a first value when the current detection coordinate is included in the compensation area, and the correction determining unit 3121 may generate the correction control signal C_CON having a second value when the current detection coordinate is excluded from the compensation area.

The coordinate moving unit 3123 may determine the current input coordinate in response to the correction control signal C_CON and the current detection coordinate. When the correction control signal C_CON has the first value, the coordinate moving unit 3123 may move the current detection coordinate such that a distance between the current detection coordinate and the most recent final coordinate is reduced and determine the current input coordinate as the moved current detection coordinate (step S1140). When the correction control signal C_CON has the second value, the coordinate moving unit 3123 may determine the current input coordinate as the current detection coordinate without movement (step S1150).

As illustrated above with reference to FIGS. 13, 14, and 15, the touch panel controller 3000 of FIG. 13 may eliminate a minute vibration from the output image without degrading the operating speed of the touch screen display device by selectively moving the current detection coordinate based on a distance between the current detection coordinate and the most recent final coordinate to generate the current input coordinate.

Figure 16:
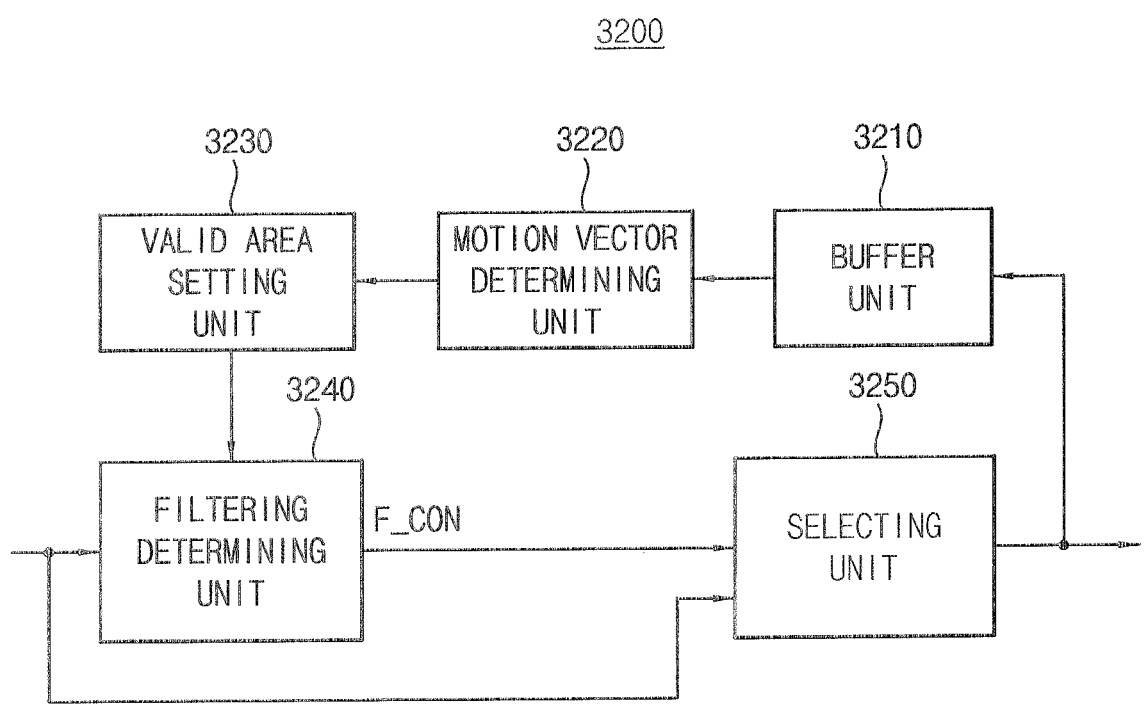
FIG. 16 is a block diagram illustrating an example of the filtering unit of FIG. 13.

FIG. 16 is a block diagram illustrating an example of the filtering unit 3200 of FIG. 13.

Referring to FIG. 16, the filtering unit 3200 may include a buffer unit 3210, a motion vector determining unit 3220, a valid area setting unit 3230, a filtering determining unit 3240, and a selecting unit 3250.

The buffer unit 3210 may store the plurality of the final coordinates received from the selecting unit 3250 and provide the plurality of the final coordinates. The buffer unit 3210 may include a memory unit to store the plurality of the final coordinates.

The motion vector determining unit 3220 may determine the motion vector representing the user's touch operation on the touch panel 110 based on the previously generated final coordinates (step S1210).

The valid area setting unit 3230 may set the valid area based on the motion vector received from the motion vector determining unit 3220.

The filtering determining unit 3240 may receive the current input coordinate from the coordinate correction unit 3120 and generate a filtering control signal F_CON based on whether the current input coordinate is included in the valid area (step S1230). The filtering determining unit 3240 may generate the filtering control signal F_CON having a first value when the current input coordinate is included in the valid area, and the filtering determining unit 3240 may generate the filtering control signal F_CON having a second value when the current input coordinate is excluded from the valid area.

The selecting unit 3250 may determine the final coordinate in response to the filtering control signal F_CON and the current input coordinate. When the filtering control signal F_CON has the first value, the selecting unit 3250 may determine the final coordinate as the current input coordinate (step S1240). When the filtering control signal F_CON has the second value, the selecting unit 3250 may eliminate the current input coordinate without determining the final coordinate since the current input coordinate may be an abnormal coordinate caused by the noises (step S1250).

In general, when the user continuously inputs an image on the touch panel 110, the user's next touch point may be determined based on a direction and a speed of the user's touch operation. That is, according to the law of inertia, when the user inputs an image on the touch panel 110, the current input coordinate may be likely to be located in the direction of the motion vector from the most recent final coordinate, and as the user's touch operation is faster (that is, as the length of the motion vector is increased), the current input coordinate may be likely to be located in a larger area.

As illustrated above with reference to FIGS. 13 and 16, the touch panel controller 3000 of FIG. 13 may prevent an abnormal distortion of an image, which usually occurs when noise is not reduced, by filtering the plurality of the input coordinates using the valid area flexibly set based on a direction and a speed of the user's touch operation.

Referring to FIGS. 1 and 13, the display unit 130 may display an image inputted by the user based on the plurality of the final coordinates received from the filtering unit 3200. The display unit 130 may display the inputted image by a line connecting a currently generated final coordinate with the most recent final coordinate.

The touch screen display device 100 may include any display devices having a touch panel, such as laptop computers, mobile phones, personal digital assistants (PDAs), etc. The touch panel 110 included in the touch screen display device 100 may include any type of touch panel, such as a resistive touch panel, a capacitive touch panel, etc.

As described above, methods of processing data to reduce noise in a touch screen display device and methods of displaying an image in a touch screen display device using the methods of processing data according to exemplary embodiments may be used in any display devices having a touch panel so that the display device correctly displays an image inputted by a user.

The foregoing is illustrative of exemplary embodiments and is not to be construed as limiting thereof Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A method of processing data in a touch screen display device, the method comprising:
    generating a plurality of input coordinates in response to a touch operation on a touch panel; and
    generating a plurality of final coordinates by filtering the plurality of the input coordinates using a valid area that is flexibly set based on a direction and a speed of the touch operation, wherein generating the plurality of the input coordinates includes:
    generating a current detection coordinate by detecting a touch point on the touch panel; and
    generating a current input coordinate based on whether the current detection coordinate is included in a compensation area a center of which is located at a most recent final coordinate, the most recent final coordinate being a most recently generated final coordinate among the plurality of the final coordinates, and wherein generating the current input coordinate includes:
    determining the current input coordinate as a moved current detection coordinate when the current detection coordinate is included in the compensation area, the moved current detection coordinate being generated by moving the current detection coordinate such that a distance between the current detection coordinate and the most recent final coordinate is reduced; and
    determining the current input coordinate as the current detection coordinate when the current detection coordinate is excluded from the compensation area.

2. The method of claim 1, wherein generating the current detection coordinate includes:
    generating N coordinate samples by sampling the touch point N times, each of the N coordinate samples including a first direction coordinate value and a second direction coordinate value, where N is a positive integer;
    selecting K first direction coordinate values and K second direction coordinate values from N first direction coordinate values and N second direction coordinate values, respectively, included in the N coordinate samples, where K is a positive integer smaller than or equal to N;
    determining a first direction coordinate value of the current detection coordinate as an arithmetic mean of the K first direction coordinate values, and determining a second direction coordinate value of the current detection coordinate as an arithmetic mean of the K second direction coordinate values.

3. The method of claim 2, wherein selecting the K first direction coordinate values and the K second direction coordinate values includes:
    sorting the N first direction coordinate values and the N second direction coordinate values in an ascending order or in a descending order, respectively; and
    determining K median values of the sorted N first direction coordinate values as the K first direction coordinate values, and determining K median values of the sorted N second direction coordinate values as the K second direction coordinate values.

4. The method of claim 1, wherein determining the current input coordinate as the moved current detection coordinate includes:
    determining a first direction coordinate value of the current input coordinate such that a ratio of a distance between the current input coordinate and the most recent final coordinate in a first direction to a distance between the current detection coordinate and the most recent final coordinate in the first direction substantially equals a ratio of a distance between the current detection coordinate and the most recent final coordinate in the first direction to a half of a length of the compensation area in the first direction; and
    determining a second direction coordinate value of the current input coordinate such that a ratio of a distance between the current input coordinate and the most recent final coordinate in a second direction to a distance between the current detection coordinate and the most recent final coordinate in the second direction substantially equals a ratio of a distance between the current detection coordinate and the most recent final coordinate in the second direction to a half of a length of the compensation area in the second direction.

5. The method of claim 1, wherein generating the plurality of the final coordinates includes:
    determining a motion vector representing the touch operation based on previously generated final coordinates;
    setting the valid area based on the motion vector;
    determining a final coordinate as the current input coordinate when the current input coordinate is included in the valid area; and
    eliminating the current input coordinate when the current input coordinate is excluded from the valid area.

6. The method of claim 5, wherein the motion vector is determined as a vector having a start point at a second most recent final coordinate and having an end point at the most recent final coordinate, the second most recent final coordinate being a most recently generated final coordinate among the plurality of the final coordinates generated before the most recent final coordinate is generated.

7. The method of claim 5, wherein the valid area is set to have a circle shape, a center of the valid area being an end point of the motion vector having a start point at the most recent final coordinate and a radius of the valid area being equal to a length of the motion vector plus a predetermined number.

8. The method of claim 5, wherein the valid area is set to have a diamond shape, a center of the valid area being an end point of the motion vector having a start point at the most recent final coordinate and a distance between the center of the valid area and each vertex of the valid area being equal to a length of the motion vector plus a predetermined number.

9. The method of claim 8, wherein whether the current input coordinate is included in the valid area is determined by comparing an Manhattan distance between the center of the valid area and the current input coordinate with an Manhattan distance between the center of the valid area and the vertex of the valid area.

10. A method of displaying an image in a touch screen display device, the method comprising:
    generating a plurality of input coordinates in response to a touch operation on a touch panel;

generating a plurality of final coordinates by filtering the plurality of the input coordinates using a valid area that is flexibly set based on a direction and a speed of the touch operation; and outputting the image inputted by the touch operation based on the plurality of the final coordinates, wherein generating the plurality of the input coordinates includes:

generating a current detection coordinate by detecting a touch point on the touch panel; and generating a current input coordinate based on whether the current detection coordinate is included in a compensation area a center of which is located at a most recent final coordinate, the most recent final coordinate being a most recently generated final coordinate among the plurality of the final coordinates, and wherein generating the current input coordinate includes:

determining the current input coordinate as a moved current detection coordinate when the current detection coordinate is included in the compensation area, the moved current detection coordinate being generated by moving the current detection coordinate such that a distance between the current detection coordinate and the most recent final coordinate is reduced; and determining the current input coordinate as the current detection coordinate when the current detection coordinate is excluded from the compensation area.

11. The method of claim 10, wherein generating the plurality of the final coordinates includes:

determining a motion vector representing the touch operation based on previously generated final coordinates;

setting the valid area based on the motion vector;

determining a final coordinate as the current input coordinate when the current input coordinate is included in the valid area; and eliminating the current input coordinate when the current input coordinate is excluded from the valid area.

* * * * *